Dec. 15, 1959 W. O. STANTON 2,917,590

MAGNETIC PHONOGRAPH PICKUP

Filed Aug. 17, 1954 5 Sheets-Sheet 1

INVENTOR
Walter O. Stanton
BY Kane, Dalsimer and Kane
ATTORNEYS

Dec. 15, 1959 W. O. STANTON 2,917,590

MAGNETIC PHONOGRAPH PICKUP

Filed Aug. 17, 1954 5 Sheets-Sheet 2

INVENTOR
Walter O. Stanton
BY
Kane, Dalsimer and Kane
ATTORNEYS

Dec. 15, 1959 W. O. STANTON 2,917,590

MAGNETIC PHONOGRAPH PICKUP

Filed Aug. 17, 1954 5 Sheets-Sheet 3

INVENTOR

Walter O. Stanton

BY

Kane, Dalsimer and Kane

ATTORNEYS

MAGNETIC PHONOGRAPH PICKUP

Filed Aug. 17, 1954 5 Sheets-Sheet 4

INVENTOR
Walter O. Stanton
BY
Kane, Dalsimer and Kane
ATTORNEYS

INVENTOR
Walter O. Stanton
BY
Kane, Dalsimer and Kane
ATTORNEYS

United States Patent Office 2,917,590
Patented Dec. 15, 1959

2,917,590

MAGNETIC PHONOGRAPH PICKUP

Walter O. Stanton, Wantagh, N.Y.

Application August 17, 1954, Serial No. 450,292
36 Claims. (Cl. 179—100.41)

This invention relates to an improved sound reproducer and more particularly to an improved phonograph pickup of the magnetic type.

It is an object of the present invention to provide an improved phonograph pickup of the above indicated type which provides a highly uniform and accurate response over a wide frequency band; which causes a minimum amount of record wear; which has a replaceable stylus assembly permitting the stylus to be readily replaced when it is worn or broken without the necessity of returning the cartridge to the shop or factory; and which is so arranged that the space between the armature and pole pieces may be readily cleaned.

Further objects include the provision of a phonograph pickup of the above type which is of relatively simple, but nevertheless rugged and strong construction so that it is economical to manufacture but will give satisfactory service over a long period of time. My improved pickup unit has the further advantage that most of the close-tolerance and costly parts are incorporated in the body of the cartridge so that the replaceable stylus assembly is relatively simple and inexpensive.

My invention contemplates the provision of an improved torsion wire mounting for the stylus supporting armature. It also contemplates the provision of an improved magnetic coupling member whereby an armature of very low mass may be utilized and whereby a readily replaceable and simple stylus assembly may be provided.

Another aspect of my invention contemplates the provision of a molded plastic tone arm with the body of the pickup (aside from the removable stylus assembly) molded integrally with the tone arm. Such a molded tone arm, with the magnetic source, pole pieces and coil of the pickup molded therein, has the advantage that there can be no relative motion or vibration between the tone arm and the body of the pickup with the result that the stylus and armature move relative to the combined tone arm and pickup eliminating the possibility of intermediate vibration by the pickup or any of its associated parts. In addition, the wiring connections can be molded integrally in the tone arm at the time of manufacture, with the result that the electrical connections and circuits are effectively protected from moisture, corrosion, etc.

Figure 1:
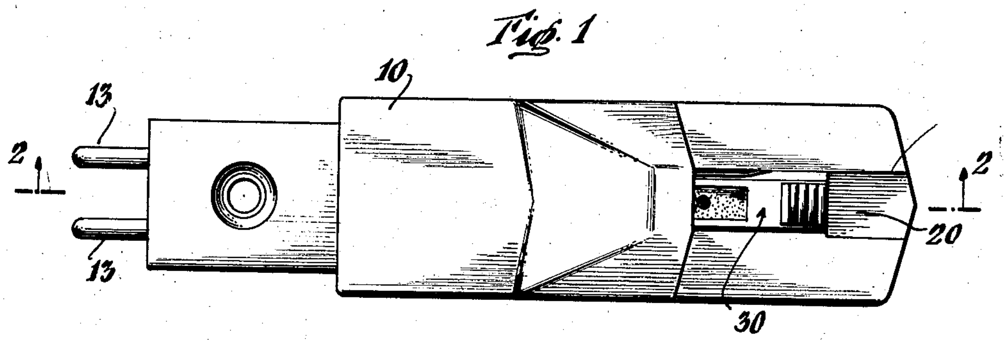
Fig. 1 is a plan view from one side of a magnetic pickup device embodying my invention and provided with two replaceable stylus assemblies on opposite sides thereof.
Figure 2:
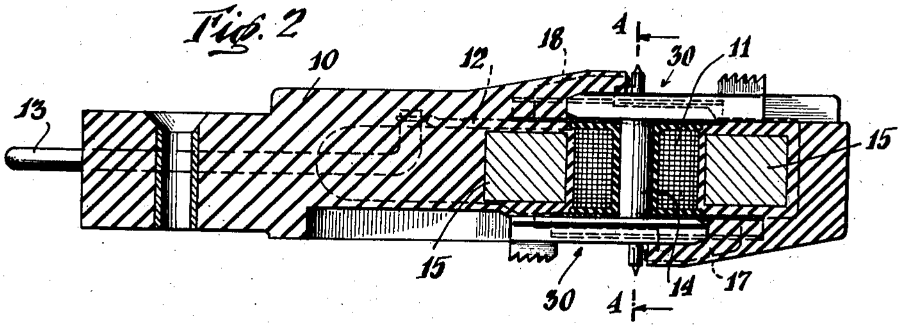
Fig. 2 is a longitudinal sectional view in the direction of the arrows on the line 2—2 of Fig. 1.
Figures 3, 4:
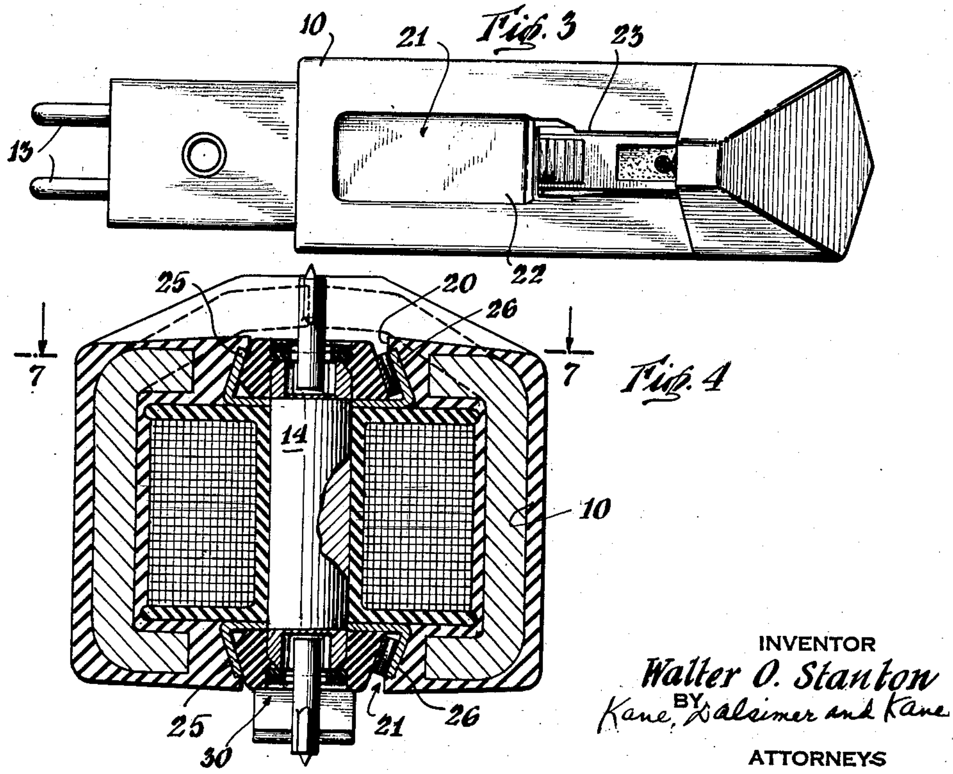
Fig. 3 is a view of the opposite side of the pickup assembly from that shown in Fig. 1.
Fig. 4 is a cross-sectional view in the direction of the arrows on the line 4—4 of Fig. 2.
Figure 5:
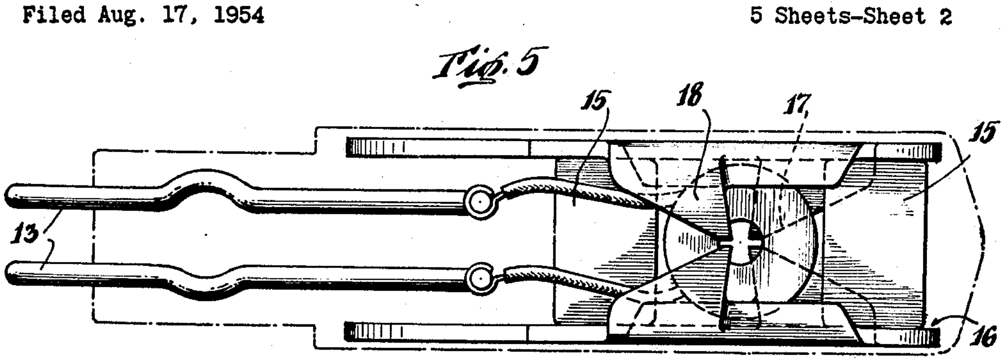
Fig. 5 is a plan view similar to Fig. 1 showing the magnetic and electrical parts in full lines and the outline of the dielectric material in dotted lines.
Figures 6, 7, 8:
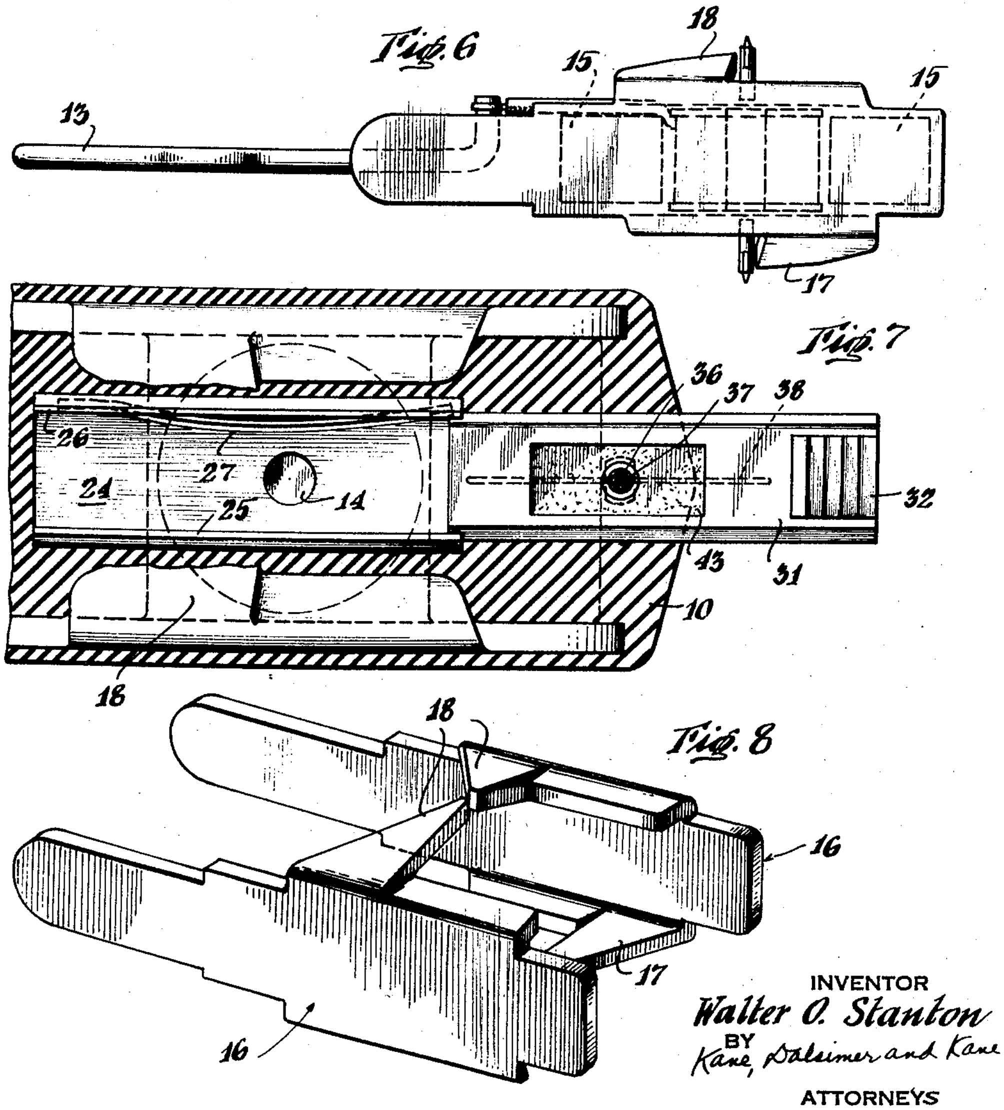
Fig. 6 is a side elevational view showing the magnetic and electrical parts with the dielectric material omitted.
Fig. 7 is a sectional view in the direction of the arrows on the line 7—7 of Fig. 4 and showing the replaceable stylus assembly partially inserted in the body of the cartridge.
Fig. 8 is a perspective view of the pole piece assembly.
Figures 9, 10:
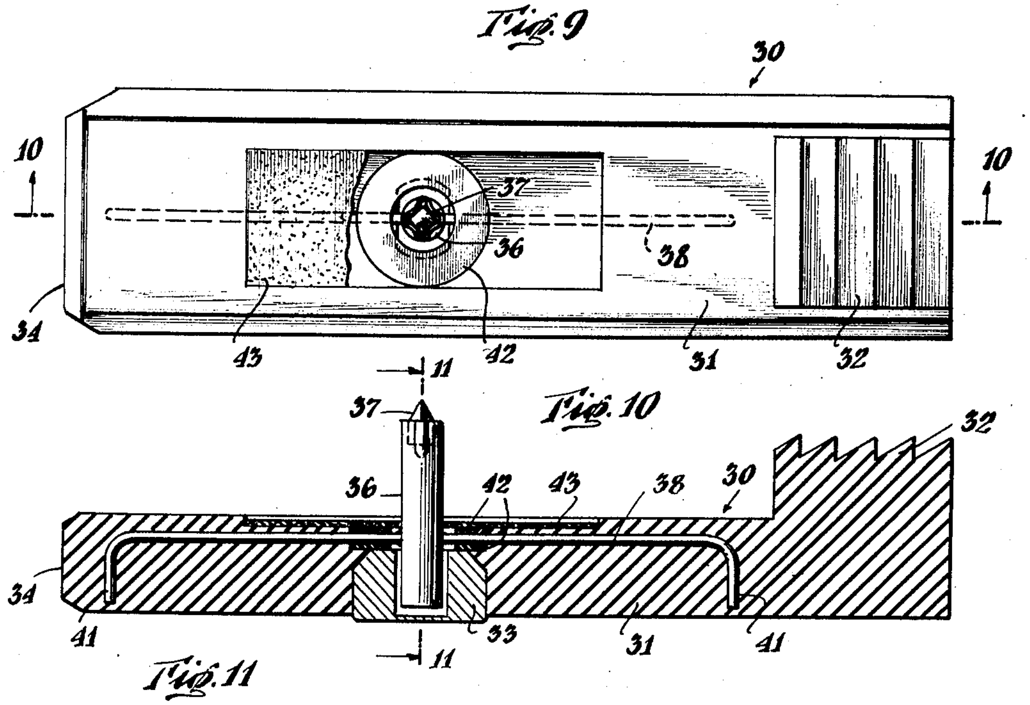
Fig. 9 is a top plan view of the removable stylus assembly.
Fig. 10 is a longitudinal sectional view through the stylus assembly in the direction of the arrows on the line 10—10 of Fig. 9.
Figure 11:
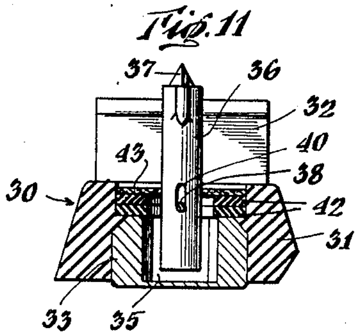
Fig. 11 is a cross sectional view in the direction of the arrows on the line 11—11 of Fig. 10.
Figure 12:
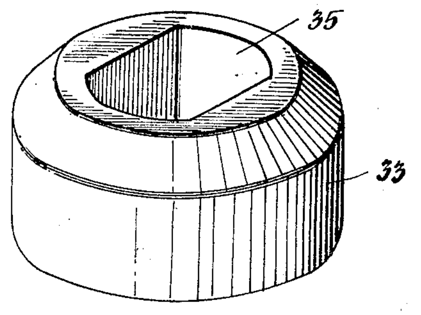
Fig. 12 is a perspective view of the magnetic coupling member used in the cartridge.
Figures 18, 19, 20, 21, 22, 23:
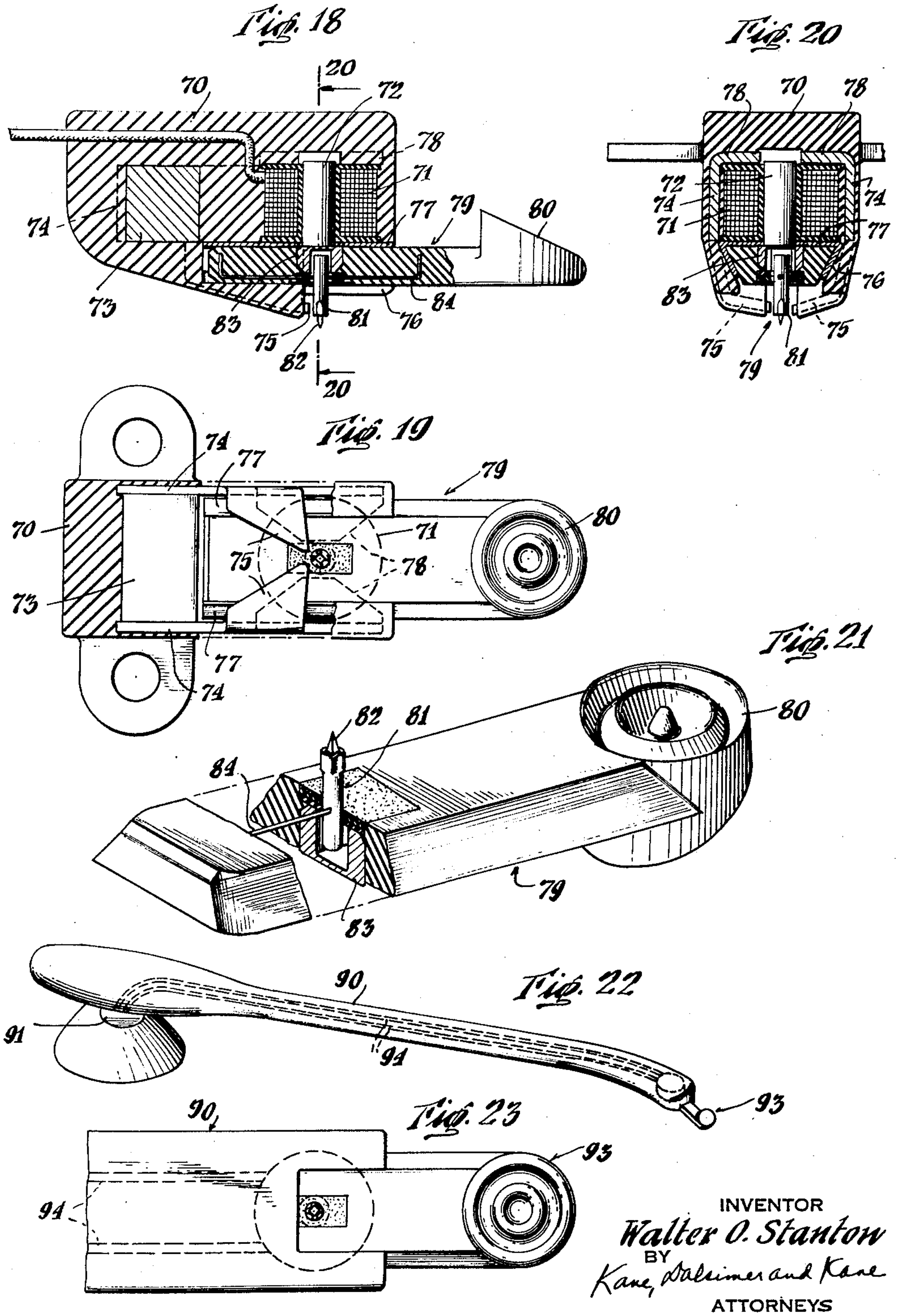
Fig. 18 is a longitudinal sectional view of a further modified form of pickup unit embodying my invention and employing only one removable stylus assembly.
Fig. 19 is a bottom plan view of the modified form of pickup assembly shown in Fig. 18 with the dielectric material and casing omitted from the cartridge body and showing merely the magnetic and electrical parts along with the removable stylus assembly.
Fig. 20 is a cross sectional view of the modified pickup unit of Fig. 18 taken in the direction of the arrows on the line 20—20 of Fig. 18.
Fig. 21 is a perspective view, with portions broken away, of the removable stylus assembly shown in Fig. 18.

Fig. 22 is a perspective view of a tone arm molded in one piece from a suitable dielectric plastic material and having the body of a pickup cartridge embodying my invention molded therein and arranged so that the replaceable stylus assembly may be inserted in or removed therefrom; and Fig. 23 is a bottom plan view of the outer end of the tone arm shown in Fig. 2 and showing the manner in which the pickup cartridge is molded directly therein.

In the several forms of my invention shown herein, I provide a magnetic system including a permanent magnet and spaced pole pieces in circuit therewith, and a generating coil with a magnetic core all supported on a suitable supporting structure. I also provide an improved moving system, having a magnetic coupling member for engaging the magnetic core and a stylus supporting armature affixed to a relatively stiff, resilient torsion wire serving to support the armature in inductive relationship with the magnetic coupling member and in a normal position of rest equally spaced from the two pole pieces. The armature may oscillate in response to the modulations of a laterally cut record groove and the torsion wire serves as the axis of oscillation and also serves as the centering spring to return the armature to its normal position of rest when the force displacing the armature is removed.

Referring to the first form of my invention shown in Figs. 1 to 13 inclusive, I show a phonograph pickup embodying my invention having a single coil and two separate moving systems on opposite sides of the pickup cartridge. In the particular form shown in Figs. 1 to 13 the several parts of the pickup device (aside from the moving systems) are molded or cast into a unitary cartridge body in suitable molds.

The supporting structure, shown generally at 10, is molded or cast from a suitable dielectric plastic material or casting resin such as phenolic resins, ureas, nylon and polystyrene. The supporting structure is molded so as to conveniently embrace and support the several parts of the pickup unit (aside from the moving systems) and so as to present a pleasing external appearance. Thus, embedded in the supporting structure, I provide the generating coil 11 connected by suitable leads 12 to the contact prongs 13 projecting from one end of the cartridge whereby the pickup may be connected to an amplifying system in the usual manner. Extending centrally through the coil is the cylindrical core 14 made of a material of high magnetic permeability such as soft iron or a nickel-iron alloy.

A pair of permanent magnets 15 are disposed on diametrically opposite sides of the coil and extend in a transverse direction with the corresponding poles of the two magnets facing in the same direction. Engaging the respective ends of the magnets are spaced pole piece members 16, made of a material of high magnetic permeability such as soft iron or a nickel-iron alloy. The pole piece assemblies are provided with elongated side members substantially parallel with the sides of the cartridge and of greater length than the coil and with the tapered pole pieces 17 and 18 projecting inwardly on the two sides of the cartridge and terminating in relatively narrow poles arranged in proximately spaced relationship, as shown most clearly in Fig. 5. The pole pieces are arranged in opposite relationship so as to overlap different segments of the coil on opposite sides thereof. It will thus be seen that the two pairs of pole pieces are connected in magnetic circuit with the permanent magnets and that a magnetic field or flux is established not only in the gaps between the pole pieces but also in the areas over the respective ends of the core 14, which, it will be seen is offset laterally with respect to the gaps between the pole pieces. The tapered arrangement of the pole pieces 17 and 18 serve to reinforce the magnetic flux at the poles. In addition to their primary function of providing a magnetic field or flux at the desired location, the pole piece assemblies also serve to shield the coil, preventing stray currents from motors, electrical apparatus, etc., from reaching the coil 11.

The assembly of permanent magnets, pole piece members, coil and core are molded or embedded within the supporting structure 10 made of dielectric plastic or casting resin so that the side, end and top surfaces of the pole pieces and coil are preferably encased in the plastic material. The opposite ends of the core 14, however, are exposed through the plastic material. If the pole pieces are exposed at the surface of the plastic material they are preferably coated with a plastic or resin to protect them from corrosion.

The opposite faces of the pickup cartridge are formed with channel shaped recesses 20 and 21 molded into the cartridge and serving to accommodate the replaceable stylus assembly or moving system. The recess 20 extends inwardly from the free end of the cartridge in the form of an open channel until it reaches the pole pieces and then continues in the form of a closed channel beneath the pole pieces. Thus, the replaceable stylus assembly may be inserted in and removed from channel 20 by simply sliding the assembly into and out of position from the free end of the cartridge. Channel 21 is arranged in opposite relationship, since the pole pieces 17 are arranged oppositely from the pole pieces 18. To permit the ready insertion and removal of the replaceable stylus assembly, channel 21 is formed with an initial open portion of greater width indicated at 22 which merges with a narrower open channel portion 23 which continues in the form of a closed channel beneath the pole pieces 17.

It is important that the recesses be formed so as to retain the replaceable stylus assembly from accidental release and so as to hold the armature in properly and equally spaced relationship with respect to the two poles of the pole pieces. For this purpose, the channels are of tapered or keystone formation, with the side walls converging from the base of the channel to the open surface thereof. In addition, I provide a channel plate 24 made of brass, or other similar non-magnetic metal in each of the channels in the area disposed over the coil and under the pole pieces. One of the converging side walls, indicated at 25, serves as a locator to properly position the replaceable stylus assembly and armature and for this reason the side wall 25 should be held to accurate dimensions and to close tolerances. The other side wall 26 has associated therewith the leaf-spring 27 which, as will be seen, serves to frictionally engage the replaceable stylus assembly to prevent it from sliding out of place, and also to press the stylus assembly into engagement with the locating wall 25. It should be noted that the two ends of the core 14 are exposed through the base of the respective channel plates 24 so that they may be engaged by the magnetic coupling members as will be hereinafter explained.

My improved stylus assembly or moving system is in the form of a replaceable slide which may be inserted into recesses 20 and 21. A pair of removable stylus assemblies 30 are shown assembled with the cartridges in Figs. 1 to 4, 6 and 7 and the details of one stylus assembly is shown in Figs. 9 to 13 inclusive.

The stylus assembly is indicated generally by the numeral 30 and it includes a supporting structure in the form of a slide or block 31 molded of plastic material or casting resin similar to that used in the cartridge body. At one end, the slide may be provided with a raised, knurled portion 32 serving as a handle whereby the replaceable assembly may be manipulated in inserting it in and removing it from the cartridge.

Embedded in the block or slide 31 is the magnetic coupling member 33 of substantially cylindrical or circular cross-sectional shape and made of material of high magnetic permeability similar to that of which the core 14 is made. The magnetic coupling member is preferably of the same cross-sectional size as the core and it is exposed at one surface of the slide so that when the slide is inserted in either recess 20 and 21 the coupling member 33 will be in direct alignment and in engagement with the end of the core.

The side walls of the slide taper inwardly similarly to the side walls 25 and 26 of the channel plate and the wall which engages the channel plate wall 25 should be critically dimensioned and held to close tolerance in order to properly center and locate the armature. Similarly, the end 34 of the slide and the corresponding ends of the channels engaged thereby should be properly dimensioned so as to hold the armature in the desired location with respect to the gap between the pole pieces.

Turning now to the magnetic coupling member 33, it will be seen that it is provided with a relatively narrow elongated central opening or recess 35 having parallel side walls arranged transversely of the member and extending partway through the member. The exposed surface of the coupling member is closed, as shown, so as to protect the respective parts from dust or metal particles, and also so as to insure maximum contact area with core 14.

Mounted in inductive relationship with respect to the coupling member and so that it may oscillate transversely with respect thereto without engaging it is the tubular stylus supporting armature 36 having the jeweled stylus 37 mounted in the outer end thereof, and having its inner end projecting into the elongated recess 35. The armature is made of a suitable material of high magnetic permeability such as soft iron or a nickel-iron alloy. It is mounted so that it can oscillate transversely in response to a transversely modulated record. In oscillating, the inner end of the armature moves back and forth in the slotted aperture 35 maintaining approximately uniform spacing with respect to the parallel side walls thereof and without contacting the coupling member. The inner end of the armature should be spaced a greater distance from the closed end of the coupling member than from the side walls thereof in any operating position to prevent distortion from inadvertent vertical movements of the armature.

Figure 13:
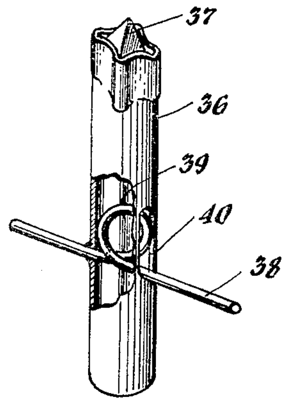
Fig. 13 is a perspective view of the armature and stylus together with the supporting torsion wire with portions of the armature broken away to show one method of mounting the armature on the torsion wire.
Figures 14, 15:
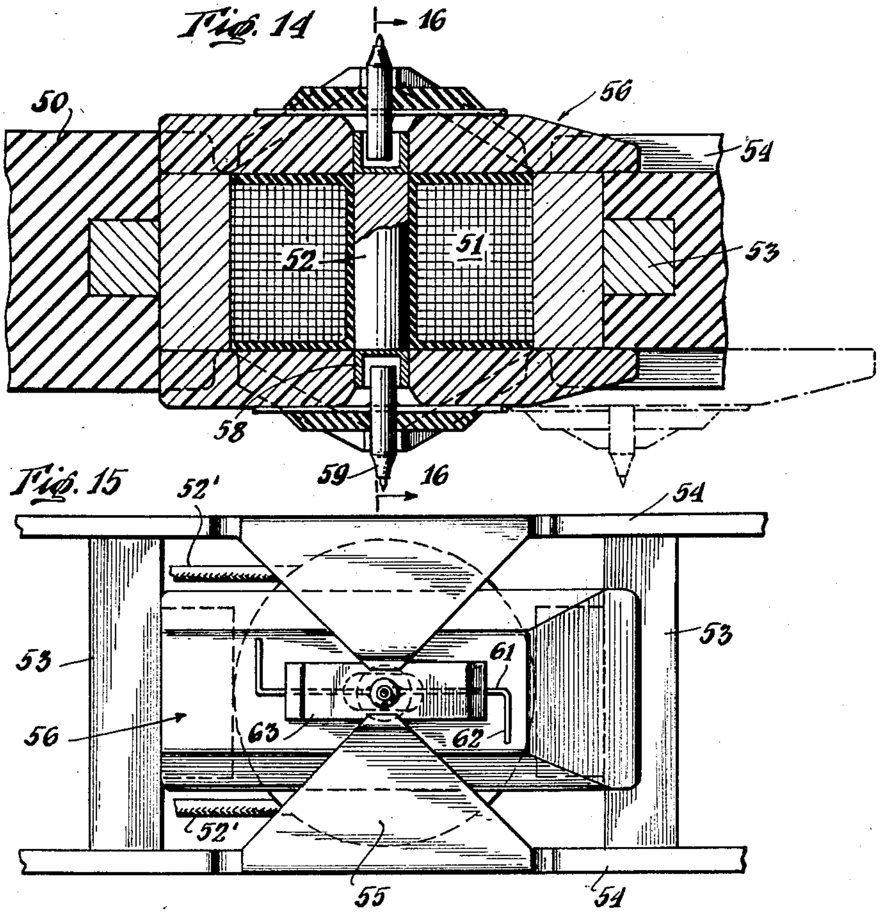
Fig. 14 is a longitudinal sectional view of a modified form of pickup assembly embodying my invention showing the replaceable stylus assemblies in normal operating position in full lines, and showing one of the replaceable stylus assemblies in partially inserted position in dotted lines.
Fig. 15 is a plan view of the modified pickup unit of Fig. 14 with the dielectric material omitted and showing the magnetic and electrical parts.
Figures 16, 17:
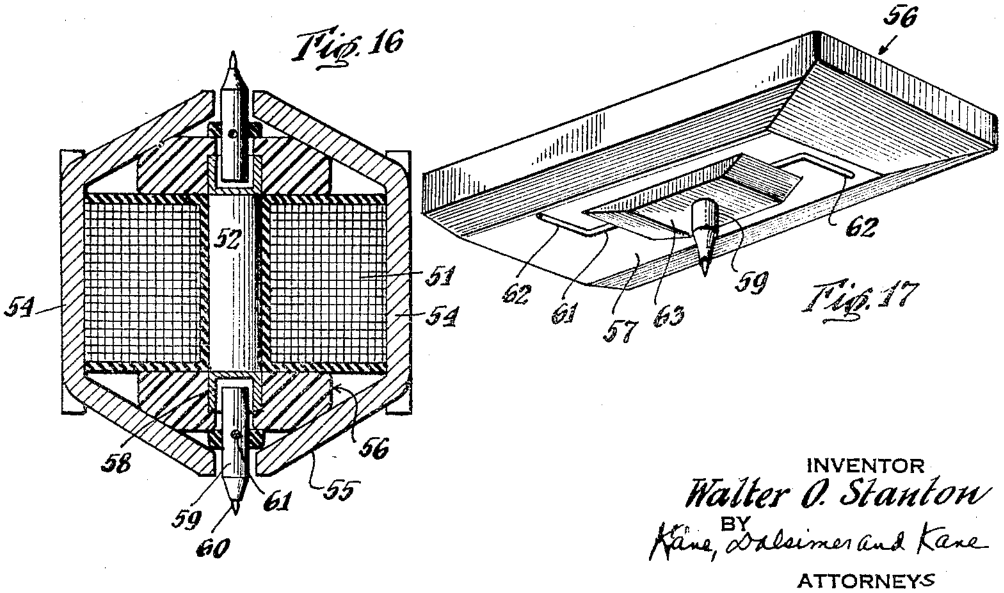
Fig. 16 is a cross sectional view in the direction of the arrows on the line 16—16 of Fig. 14.
Fig. 17 is a perspective view of the removable stylus assembly used in the modified form of pickup shown in Fig. 14.

The armature supporting member preferably takes the form of a relatively stiff resilient torsion wire 38 made of music wire, beryllium-copper or other spring metal, although I prefer to employ a magnetic material. The torsion wire extends through the armature and is fixedly secured thereto in some suitable manner so that the armature or wire oscillates or rotates as a unit. Thus, as shown in Fig. 13, the portion of the wire disposed inside the armature may be laterally offset as by being formed into a loop and the laterally offset portion 39 is arranged so as to be in frictional engagement with the armature. One side of the armature may be provided with a slotted aperture 40 to facilitate assembly of the torsion wire with the armature. The torsion wire extends in a longitudinal direction parallel with the axis of the slide and at two points spaced from opposite sides of the armature the wire is formed into the offset angular end portions 41 fixedly secured to the slide so as to prevent rotation thereof by being embedded therein.

The replaceable stylus assembly may be assembled and molded as a unit. To prevent the plastic or resinous molded material from filling the slotted recess 35, a pair of washers 42 made of neoprene, synthetic rubber or the like are preferably placed over the end of the magnetic coupling member on opposite sides of the torsion wire as shown. Also due to the fact that the wire is spaced from the magnetic coupling member it cannot contact or vibrate against the coupling member during the oscillation of the armature. At the same time the torsion wire is supported for the major portion of its length by the bearing surfaces provided by the body of the slide and the washers thereby preventing or minimizing undesirable oscillations of the wire while freely permitting torsional or rotary oscillations thereof. The face of the slide surrounding the armature is preferably provided with a recess 43 and plastic damping material of known type is applied thereto by painting or otherwise to dampen the oscillations of the armature.

When the replaceable stylus assemblies are inserted in the recesses 20 and 21, the armatures are supported for lateral oscillation in the magnetic field of the respective pairs of pole pieces and they are equally spaced from the poles, in front of the respective gaps when in a normal position of rest.

It will thus be seen that the armature is supported by the torsion wire in a normal position of rest with the inner end disposed in the recess in the coupling member and with the outer end properly located with respect to the pole pieces but so that it is free to oscillate laterally in response to laterally cut records, with the torsion wire serving as the axis of oscillation, and also serving as a centering spring to return the armature to its normal position of rest when the force displacing it is removed. The damping material serves to dampen the vibrations or oscillations of the armature in the usual manner.

In using my improved pickup, the pickup is first assembled with a tone arm in the usual manner and the replaceable stylus assemblies are inserted in the recesses

20 and 21 and are shifted into place with the end 34 of the assemblies in engagement with the bases of the respective channels. The ends and side walls 25 of the channels then serve to properly position the armature with respect to the poles of the pole pieces so that the armature is equally spaced from the two pole pieces when at a position of rest and so that in the present embodiment the armature is offset in front of a plane connecting the two pole pieces. By arranging the armature in front of the pole pieces in this fashion, it is easy to keep the space between the pole pieces and armature clean and free of foreign particles which might interfere with or affect the oscillations of the armature. In addition, a lighter spring can be used than when the armature is in the gap thereby decreasing wear on the record groove and decreasing distortions resulting from the interference imposed by a stronger spring on the oscillation of the armature.

My improved magnetic coupling member permits the use of a relatively small, light armature which also minimizes distortion and increases the life of the records. Furthermore, it facilitates the provision of a simple replaceable stylus assembly since projecting armatures or other parts can be eliminated and the assembly can be in the form of a slide which is merely shifted into place by a sliding motion with the coupling member in engagement with the core member of the coil.

My improved torsion wire support for the armature provides a simple, light supporting device whereby the armature can be readily held in the desired position of rest so that it can readily oscillate laterally in response to the groove of a laterally cut record and so that it will be returned to its normal position of rest when the displacing force is removed.

My improved moving system also permits the poles of the pole pieces to be positioned near the outer end of the armature, that is, immediately adjacent the point where the stylus is mounted thereby minimizing distortion which might result from flexing or bending of the armature.

In the particular embodiment shown in Figs. 1 to 13, I have provided two separate moving systems on opposite sides of the cartridge which are used at separate times to play opposite sides of records. Since both moving systems are magnetically coupled to the same generating coil a highly uniform response is obtained from the two sides of the pickup.

In using my pickup, it is assembled with a phonograph tone arm in the usual manner and the leads from the generating coil are connected to the amplifying system of the phonograph. The stylus of one of the two moving systems is applied to the groove of a laterally cut record with the result that the armature is oscillated in response to the modulations of the record groove. Since the armature is located in the magnetic field of the pole pieces magnetic flux is established in the armature. The armature is in inductive relationship with the coupling member which, in turn, directly engages the core extending through the generating coil. The coupling member of the moving system at the opposite side of the pickup which is not in use is magnetically neutral since the armature is centered between the pole pieces. Accordingly, a magnetic flux is established in the core in response to the oscillations of the armature which is in use and this, in turn, generates electrical impulses in the coil.

Referring now to the form of my invention shown in Figs. 14 to 17 inclusive, I have shown another phonograph pickup having two stylus assemblies and a single generating coil. However, in this form of device the armature is centered in the gap between the pole pieces rather than being offset to one side thereof.

Referring to the drawings, I have shown a molded supporting structure 50 made of a suitable dielectric plastic or casting resin in which is embedded the generating coil 51 having suitable leads 52' whereby the coil may be connected to an amplifying system. Extending through the coil is the cylindrical core 52 made of a material of high magnetic permeability and positioned on diametrically opposite sides of the coil are the permanent magnets 53 arranged transversely of the cartridge body and engaging with the pole piece members 54 which extend along the opposite longitudinal edges of the cartridge. The pole piece members are provided with inwardly extending pole pieces 55 terminating in spaced poles centered over the core extending through the coil 51. Between the coil and pole pieces is a space or recess as shown to accommodate the replaceable stylus assembly and the core 52 is exposed on opposite sides of the coil to engage the magnetic coupling member.

The stylus assembly in the modified structure shown in Figs. 14 through 17 is shown generally at 56 and consists of a supporting block or slide 57 made of a dielectric plastic or casting resin and having the magnetic coupling member 58, similar to the coupling member 33 in the first form of my invention, embedded therein with its closed end exposed at the inner surface of the slide so that it can engage with the core 52 when the slide is assembled with the cartridge. Also mounted on the slide is the stylus supporting armature 59 which carries the jewel stylus 60 at its outer end and is arranged so that its inner end projects into the recess in the coupling member.

The mounting for the armature consists of the torsion wire 61 which is fixedly secured to the armature by brazing or soldering or by the method shown in first form of my invention. At a spaced distance from the opposite sides of the armature the torsion wire is laterally offset as shown at 62 and the laterally offset portions are fixedly secured to the supporting slide or block as by cement or by being embedded therein thereby preventing relative rotation of the ends of the wire relative to the slide. When the stylus is engaged with a laterally cut record groove the stylus and armature may oscillate with the supporting wire serving as a torque rod. The central portion of the wire partially rotates with the oscillation of the armature and due to its resiliency it will serve as a centering spring to return the armature to its normal position of rest when the displacing force is removed.

Suitable damping material, such as the damping pad 63 made of neoprene or other damping material, may be applied to the supporting slide around the armature to dampen the oscillation thereof in the usual manner.

The inner end of the slide and the beveled side surfaces thereof are critically dimensioned and held to close tolerances as are the inner surfaces of the pole pieces so as to properly locate and center the armature between the pole pieces when the slide is fully inserted. The replaceable stylus assembly may be readily inserted by sliding it into place beneath the pole pieces and it is used in a similar manner as the first form of my invention.

In Figs. 18 to 20, I have shown a further modified form of phonograph pickup embodying my invention having a single replaceable stylus assembly. In this form of my invention I provide a molded supporting structure 70 having generating coil 71 embedded therein through which the core member 72 made of material of high magnetic permeability extends. Spaced from the coil and arranged transversely of the cartridge is the permanent magnet 73 engaging the pole piece members 74 which extend longitudinally of the cartridge on the two sides thereof. The pole pieces 75 extend inwardly from the pole piece members and terminate in spaced poles adjacent to but offset with respect to the core 72 in a similar fashion to the pole pieces in the first form of my invention.

As in the first form of my invention, a channel 76 to receive the replaceable stylus assembly is molded into the supporting structure and a channel plate 77 is located therein having the end of the core 72 exposed therethrough. Additional pole pieces 78 extend over the opposite surface of the coil and terminate in spaced poles providing a gap centered over the upper end of the core so that the upper end of the core is magnetically neutral.

The replaceable stylus assembly shown generally at 79 is quite similar to that shown in the first form of my invention and has an embossed handle portion 80 whereby it may be readily grasped in the hand and inserted or removed from place. The armature 81 made of material of high magnetic permeability has stylus 82 mounted in its lower end and its upper end projects into the recess formed in the coupling member 83. The armature is fixedly secured to the torsion wire 84 as, for instance, in the same manner as in the other forms of my invention and the torsion wire, in turn, is fixedly secured to the slide at spaced points from the opposite side of the armature.

The operation of this form of my invention is essentially the same as the operation of the other two forms with the exception that only a single moving system is provided.

In Figs. 22 and 23 I have shown another aspect of my invention in which all parts of a phonograph pickup, with the exception of the moving system, are molded integrally with a tone arm 90. The tone arm 90 is molded or cast in one-piece of a suitable plastic material or casting resin. The specific form of tone arm may be varied as may the pivotal mounting thereof. One type of pivotal mounting 91 is shown in the accompanying drawings and the end of the tone arm beyond the mounting may be suitably counter-balanced. Molded integrally in the tone arm adjacent the free end thereof is one form of phonograph pickup such as that shown in Figs. 18 and 20. In other words, the coil, core, magnet and pole pieces are molded integrally with the tone arm. The replaceable stylus assembly 93, which may be similar to the stylus assembly 79 shown in Figs. 18 to 20, is inserted and removed in the same manner as in the above referred to form of my invention. The leads 94 of the generating coil are likewise molded integrally with the tone arm and may extend downwardly through the mounting 91. The unitary molded tone arm and cartridge body assembly has the advantage that the electrical connections and leads are protected from corrosion and there can be no relative vibration between the tone arm, coil, magnet, pole pieces, etc., the vibration being confined to the oscillation of the armature relative to the other parts.

It will thus be seen that I have provided an improved phonograph pickup of the magnetic type which provides a highly uniform and accurate response over a wide frequency band; which causes a minimum amount of record wear; and which has a replaceable stylus assembly permitting the stylus to be readily replaced when it is worn or broken. It will also be seen that I have provided an improved unitary tone arm in which the body of the pickup and the electrical leads are molded integrally therein with only the moving system formed as a separate replaceable unit.

Modifications may of course be made in the illustrated and described embodiments of my invention without departing from the invention as set forth in the accompanying claims.

I claim:

1. A phonograph pickup unit comprising: a supporting structure; a magnetic system carried by the supporting structure and including a permanent magnet and a pair of pole pieces connected in circuit therewith and arranged in spaced relationship; a stylus supporting armature made of material of high magnetic permeability; a resilient relatively stiff torsion wire fixedly secured to the armature and extending beyond diametrically opposite sides thereof and fixedly mounted with respect to the supporting structure at a spaced distance from the oposite sides of the armature for supporting the armature in a normal position of rest equally spaced from the two pole pieces in the magnetic field thereof and so that it may oscillate towards and away from the respective pole pieces with the torsion wire serving as the axis of oscillation and also serving to return the armature to its normal position, said supporting structure providing bearing means engaging the wire so as to substantially limit all oscillations thereof excepting torsional oscillations; and a current generating coil carried by the supporting structure and being inductively coupled to said armature whereby oscillation of the armature in the magnetic field generates current flow in said coil.

2. A phonograph pickup as set forth in claim 1 in which the bearing means includes bearing means of resilient material surrounding but free from attachment with the armature and providing resilient support for the central portion of the wire adjacent the armature.

3. A phonograph pickup as set forth in claim 1 in which the armature is in the form of a tubular member, the torsion wire extends through and projects beyond opposite sides of the armature and is fixedly mounted with respect to the supporting structure at two points spaced from opposite sides of the armature and the torsion wire is fixedly secured to the armature by being formed into a laterally offset portion disposed inside the armature in frictional engagement therewith.

4. A phonograph pickup as set forth in claim 1 in which the armature is supported by the torsion wire in a plane which is offset along the longitudinal axes of the pickup with respect to the plane which connects the two pole pieces.

5. A phonograph pickup as set forth in claim 1 in which the supporting structure includes a separate member removably mounted with respect to the supporting structure and which in turn supports the torsion wire and armature.

6. A separate replaceable moving system for a phonograph pickup of the magnetic type comprising: supporting means; a stylus supporting armature made of material of high magnetic permeability; and a resilient relatively stiff torsion wire fixedly secured to and extending from diametrically opposite sides of the armature and engaging supporting means at points spaced from opposite sides of the armature and being secured to the supporting means for supporting said armature in a normal position of rest so that it may oscillate with the torsion wire serving as the axis of oscillation and also serving to return the armature to its normal position of rest, supporting structure providing bearing means engaging the wire so as to substantially limit all oscillations thereof excepting torsional oscillations.

7. A separate replaceable moving system for a phonograph pickup as set forth in claim 6 in which the armature is a tubular member and the torsion wire is fixedly secured to the armature by means of a laterally offset portion in the torsion wire disposed inside and frictionally engaging the armature.

8. A phonograph pickup as set forth in claim 7 in which the bearing means includes bearing means of resilient material surrounding but free from attachment with the armature and providing resilient support for the central portion of the wire adjacent the armature.

9. An improved moving system for use with a phonograph pickup of the type having a magnetic system including a permanent magnet and spaced pole pieces and a current generating coil, said moving system comprising; a supporting structure; a magnetic coupling member made of material of high magnetic permeability mounted on said supporting structure; a stylus supporting armature made of material of high magnetic permeability; and means for supporting the armature on the supporting structure so that said armature may oscillate in an inductive relationship with said magnetic coupling member but free from direct contact therewith.

10. A moving system for a magnetic phonograph pickup as set forth in claim 9 in which the supporting means for the armature is a relatively stiff resilient torsion wire fixedly secured to the armature at a point intermediate its ends and also fixedly secured to the supporting structure a spaced distance from the armature so that the armature is supported in a normal position of rest so that it may oscillate with the torsion wire serving as the axis of oscillation and also serving to return the armature to its normal position of rest.

11. An improved moving system for use with a phonograph pickup of the type having a magnetic system including a permanent magnet and spaced pole pieces and a current generating coil, said moving system comprising: a supporting structure; a magnetic coupling member made of material of high magnetic permeability having a recess formed therein; a stylus supporting armature made of material of high magnetic permeability and supported on said supporting structure; and means supporting said armature on said supporting structure so that it may oscillate and with a portion of the armature disposed in the recess in the coupling member, said armature and armature supporting means being arranged so that the armature is free from engagement with the magnetic coupling member when the armature oscillates.

12. A moving system for a magnetic phonograph pickup as set forth in claim 11 in which the supporting means for the armature is a relatively stiff resilient torsion wire fixedly secured to the armature at a point intermediate its ends and also fixedly secured to the supporting structure a spaced distance from the armature so that the armature is supported in a normal position of rest so that it may oscillate with the torsion wire serving as the axis of oscillation and also serving to return the armature to its normal position of rest.

13. A separate replaceable moving system for a magnetic phonograph pickup comprising: a supporting structure made of non-magnetic material; a magnetic coupling member made of material of high magnetic permeability said coupling member having a recess entering from one side thereof with the opposite side flush with one surface of the supporting structure; a stylus supporting armature made of material of high magnetic permeability; and means for supporting said armature on said supporting structure for oscillatory movement with one end of the armature positioned in the recess in the coupling member, said armature and armature supporting means being arranged so that the armature is in inductive relationship with the coupling member but is free from direct contact therewith.

14. A separate replaceable moving system for a magnetic phonograph pickup as set forth in claim 13 in which the recess formed in the magnetic coupling member is relatively narrow and elongated with the longitudinal sides of the recess disposed in substantially parallel relationship.

15. A separate replaceable moving system for a magnetic phonograph pickup as set forth in claim 13 in which the armature supporting means is in the form of a relatively stiff resilient torsion wire fixedly secured to the armature at a point intermediate its ends and fixedly secured to the supporting structure at a point spaced from the armature so as to support the armature in a normal position of rest but so that the armature may oscillate with the torsion wire serving as the axis of oscillation and also serving to return the armature to its normal position of rest.

16. A phonograph pickup of the magnetic type comprising: a magnetic system including a pair of spaced pole pieces; a generating coil positioned adjacent said pole pieces; a supporting structure for said magnetic system and generating coil, said supporting structure being provided with a recess which extends at least in part between the pole pieces and the generating coil; and a removable stylus assembly including a supporting slide cooperable to be inserted in the recess in the supporting structure, a stylus supporting armature made of material of high magnetic permeability and means for supporting said armature on the slide so that the outer end thereof is equally spaced from the two pole pieces in the magnetic field thereof when the slide is inserted in the recess and so that it may oscillate laterally in response to laterally cut records, the inner end of the armature being contained within the confines of the slide and the inner end of the slide being free from projections whereby said stylus assembly may be inserted and removed by sliding action only.

17. A phonograph pickup of the magnetic type as set forth in claim 16 in which the means for supporting the armature on the slide comprises a relatively stiff resilient torsion wire fixedly secured to the armature and to the slide at a point spaced from the armature with the torsion wire serving as the axis of oscillation for the armature and serving also to return the armature to a normal position of rest equally spaced from the two pole pieces.

18. A phonograph pickup of the magnetic type as set forth in claim 16 in which the recess in the supporting structure is in the form of a channel with side walls converging from the base of the channel to the open face thereof and in which the slide is of corresponding shape so as to be retained against accidental displacement.

19. A phonograph pickup of the magnetic type as set forth in claim 16 in which the recess is in the form of a channel and one of the side walls of the channel is provided with an elongated spring engageable with the side of the slide to frictionally hold it in place.

20. A phonograph pickup of the magnetic type as set forth in claim 16 in which the recess is in the form of a channel and one side wall of the channel and the corresponding side wall of the slide serve as locators to properly position and center the slide and armature and a spring member is provided in association with the other side wall of the channel so as to press the slide into engagement with the channel wall serving as the locator.

21. A phonograph pickup of the magnetic type as set forth in claim 16 in which a core made of material of high magnetic permeability extends through the coil and has one end exposed in the recess and a magnetic coupling member also made of material of high magnetic permeability is mounted in said slide so as to engage the core when the slide is inserted in the recess and so as to be in inductive relationship with the end of the armature.

22. A phonograph pickup of the magnetic type comprising: a molded resin supporting structure with a channel shaped recess formed in one surface thereof; a magnetic system including a permanent magnet and a pair of pole pieces connected in circuit therewith and presenting a pair of proximately spaced poles arranged so that a portion of the channel shaped recess extends beneath the poles; a generating coil embedded in the supporting structure and having a core made of material of high magnetic permeability extending therethrough with one end exposed in the recess adjacent the poles; and a moving system in the form of a supporting slide cooperable to be inserted in the channel shaped recess, a stylus supporting armature made of a material of high magnetic permeability, a relatively stiff resilient torsion wire fixedly secured to an intermediate portion of the armature and to the supporting slide at a point spaced from the armature so that the armature is equally spaced from the two poles when the slide is inserted in the recess and so that the armature may oscillate with the torsion wire serving as the axis of rotation and also serving to return the armature to its normal position of rest with its outer end equally spaced from the two poles, the inner end of said armature being contained within the confines of the slide, and a magnetic coupling member made of material of high magnetic permeability mounted on said slide with the end thereof flush with the inner surface of the slide so as to engage the exposed end of the core when the slide is assembled in the recess and so that the coupling member is in inductive relationship with the armature, the inner surface of said slide being free from projections whereby said moving system may be inserted and removed by sliding action only.

23. A phonograph pickup of the magnetic type comprising: a supporting structure; a magnetic system including a permanent magnet and a pair of tapered pole pieces in circuit therewith and presenting a pair of relatively narrow proximately spaced poles; a generating coil mounted on said supporting structure adjacent but spaced from said spaced poles; a stylus supporting armature made of a material of high magnetic permeability arranged so that the inner end thereof is coupled to said generating coil and so that the extreme outer end thereof is equally spaced from the two poles in the magnetic field thereof and positioned in a plane offset with respect to the gap between the poles; and means supporting the armature on the supporting structure so that it may oscillate towards and away from the respective poles in said plane offset to the side of the gap.

24. A phonograph tone arm assembly comprising a unitary elongated arm molded of dielectric plastic material provided with means for pivotally mounting the arm at one end and provided with a head portion at the other end, said head portion having integrally molded and embedded therein the parts of a phonograph pickup including a magnetic system and a current generating system and being formed with a recess to accommodate a replaceable moving system said arm also having integrally embedded and molded therein lead wires which extend from the phonograph pickup to the mounting portion of the arm.

25. A phonograph tone arm assembly comprising: a unitary arm in the form of an elongated member molded from a dielectric plastic material and having means for pivotally mounting the arm adjacent one end and a relatively enlarged head with a channel shaped recess formed therein adjacent the other end; a magnetic system including a permanent magnet and a pair of pole pieces in circuit therewith integrally embedded and molded in the enlarged head of the arm with the pole pieces arranged in spaced relationship adjacent the channel shaped recess; a generating coil integrally embedded and molded in the head portion of the arm adjacent the pole pieces; and a separate replaceable moving system in the form of a supporting slide releasably engageable with the channel shaped recess, a stylus supporting armature made of a material of high magnetic permeability, and means for supporting the armature on the slide so that it is equally spaced from the pole pieces in the magnetic field thereof when the slide is inserted in the recess and so that it may oscillate but will return to its normal position equally spaced from the pole pieces when the displacing force is removed therefrom.

26. A phonograph pickup of the magnetic type comprising: a supporting structure; a magnetic system supported by the supporting structure and including a pair of spaced pole pieces; a generating coil supported by said supporting structure adjacent said pole pieces; a core made of a material of high magnetic permeability positioned in said coil and having a magnetic coupling portion also made of a material of high magnetic permeability at one end thereof, said magnetic coupling portion having a recess extending inwardly from one end thereof; and a stylus supporting armature made of a material of high magnetic permeability and supported by said supporting structure for oscillatory movement with a portion of the armature being positioned adjacent the pole pieces and one end of said armature being positioned in the recess in the coupling portion and being in inductive relationship therewith but being free from direct contact therewith.

27. A phonograph pickup unit comprising: a supporting structure; a magnetic system carried by the supporting structure and including a permanent magnet and a pair of pole pieces connected in circuit therewith and arranged in spaced relationship; a stylus supporting armature made of material of high magnetic permeability; a resilient relatively stiff torsion wire having its central portion fixedly secured to the armature and its end portions, each of which forms an angle with the axis of the central portion of the wire, imbedded in the supporting structure at a spaced distance from the armature to prevent the end portions of the torsion wire from moving upon movement of said central portion, said torsion wire supporting the armature in a normal position of rest equally spaced from the two pole pieces in the magnetic field thereof and so that it may oscillate towards and away from the respective pole pieces with the central portion of the torsion wire serving as the axis of oscillation and also serving to return the armature to its normal position of rest; a bearing member of resilient material adjacent the supporting structure and surrounding but free from attachment with the armature, said bearing member providing support for the torsion wire and isolating said torsion wire from the supporting structure in the area adjacent the armature; and a current generating coil carried by the supporting structure and being inductively coupled to said armature whereby oscillation of the armature in the magnetic field generates current flow in said coil.

28. A separate replaceable moving system for a phonograph pickup of the magnetic type comprising: a supporting member; a stylus supporting armature made of material of high magnetic permeability; and a resilient relatively stiff torsion wire having its central portion fixedly secured to the armature and its end portions, each of which forms an angle with the axis of the central portion of the wire, imbedded in the supporting member at a spaced distance from the armature to prevent the end portions of the torsion wire from moving upon movement of said central portion, said torsion wire supporting said armature in a normal position of rest so that it may oscillate with the central portion of the torsion wire serving as the axis of oscillation and also serving to return the armature to its normal position of rest; and a bearing member of resilient material adjacent the supporting member and surrounding but free from attachment with the armature, said bearing member supporting the torsion wire and isolating said torsion wire from the supporting member in the area adjacent the armature.

29. A phonograph pickup of the magnetic type comprising: a body portion having a permanent magnet and a current generating coil incorporated therein and pole pieces extending outwardly from one surface of the body portion and having terminal portions spaced outwardly from the body portion so as to provide a recess between the terminal portions and the body portion; and a removable stylus assembly including a supporting slide cooperable to be inserted in the recess in the supporting structure, a stylus supporting armature made of material of high magnetic permeability and means for supporting said armature on the slide for oscillatory movement so that the outer end thereof is equally spaced from the two pole pieces in the magnetic field thereof when the slide is inserted in the recess, the inner end of the armature being contained within the confines of the slide whereby said stylus assembly may be inserted and removed by sliding action only.

30. A magnetic phonograph pickup comprising: a cartridge formed with an elongated channel shaped recess in one surface thereof and having a supporting structure, a magnetic system including a permanent magnet and current generating means including a coil; and a separate replaceable moving system including a support, an armature and means supporting the armature on the support for oscillatory movement, said moving system being of elongated shape and corresponding to the shape of the channel recess in the cartridge and being releasably engageable with and removable from said recess simply by longitudinal slide movement.

31. A magnetic phonograph pick-up comprising: a supporting structure in the form of a cartridge having means providing an open-ended channel adjacent one surface thereof; a current generating and magnetic system supported in the cartridge and including a permanent magnet, current-generating coil means, and a pair of pole pieces projecting from the cartridge adjacent said channel; and a separate replaceable moving system comprising a base member, a stylus and means including a member of high magnetic permeability for supporting the stylus on the base member for oscillatory movement, said moving system being of a size and shape corresponding to the shape of the channel and being releasably engageable with and removable from the channel by longitudinal slide movement and said movable system being arranged so that said member of high magnetic permeability is equally spaced from the pole pieces when the moving system is in place in the channel.

32. A magnetic phonograph pick-up as set forth in claim 31, in which the channel and moving system are provided with inter-engaging portions serving as stops to properly position the moving system in the slide with the member of high magnetic permeability being equally spaced from said pole pieces.

33. A magnetic phonograph pick-up as set forth in claim 31, in which spring means are provided between the side of the channel and the moving system to frictionally retain the moving system in place.

34. A magnetic phonograph pick-up comprising a supporting structure, a current-generating assembly including coil means and spaced pole pieces, said structure and assembly including a socket-like recess open at one end and formed adjacent one surface, and a replaceable moving system including a support, a stylus and stylus mounting means including a magnetic member for supporting said stylus on said support for oscillatory movement, said moving system being insertable in and removable from said socket-like recess by longitudinal movement and said magnetic member being substantially equally spaced from said pole pieces when said moving system is inserted in the socket-like recess.

35. A magnetic phonograph pickup as set forth in claim 34 in which a wire is connected between the stylus mounting means and the support so as to support the stylus mounting means for oscillatory movement.

36. An improved replaceable moving system for use with a phonograph pickup of the type having a magnetic circuit including an exposed portion of magnetic material, said moving system comprising: a supporting structure; a magnetic coupling member for engaging the exposed portion of magnetic material and made of material of high magnetic permeability mounted on said supporting structure; a stylus assembly including a stylus and a stylus mounting including a portion of magnetically permeable material; and means for supporting the stylus assembly on the supporting structure so that said stylus mounting may oscillate with said portion of magnetically permeable material in inductive relationship with said magnetic coupling member but free from direct contact therewith.

References Cited in the file of this patent

UNITED STATES PATENTS

| | | |
|---|---|---|
| 1,666,183 | Shapiro | Apr. 17, 1928 |
| 1,909,995 | Yeider | May 23, 1933 |
| 2,554,208 | Peterson et al. | May 22, 1951 |
| 2,554,209 | Miner | May 22, 1951 |
| 2,622,156 | Baker | Dec. 16, 1952 |
| 2,820,853 | Dally | Jan. 21, 1958 |
| 2,829,210 | Baker | Apr. 1, 1958 |